(12) United States Patent  
Chollet

(10) Patent No.: US 7,587,610 B2
(45) Date of Patent: Sep. 8, 2009

(54) BIOMETRIC IDENTIFICATION OR AUTHENTICATION SYSTEM

(75) Inventor: Christophe Chollet, Cergy (FR)

(73) Assignee: Sagem Securite, Paris (FR)

( * ) Notice: Subject to any disclaimer, the term of this patent is extended or adjusted under 35 U.S.C. 154(b) by 837 days.

(21) Appl. No.: 10/467,370

(22) PCT Filed: Feb. 1, 2002

(86) PCT No.: PCT/FR02/00391

§ 371 (c)(1),
(2), (4) Date: Dec. 8, 2003

(87) PCT Pub. No.: WO02/063548

PCT Pub. Date: Aug. 15, 2002

(65) Prior Publication Data

US 2004/0073805 A1    Apr. 15, 2004

(30) Foreign Application Priority Data

Feb. 7, 2001    (FR) .................................. 01 01634

(51) Int. Cl.
*G06F 21/00*    (2006.01)
(52) U.S. Cl. ...................... 713/186; 382/100; 382/115; 382/124; 707/4; 707/102; 705/67
(58) Field of Classification Search ................. 382/124, 382/115, 100; 713/186; 726/3; 705/75, 705/5, 67; 707/6, 102, 104.1, 4; 360/180
See application file for complete search history.

(56) References Cited

U.S. PATENT DOCUMENTS

| 6,018,739 | A  | * | 1/2000 | McCoy et al. ................ 707/102 |
| 6,040,783 | A  |   | 3/2000 | Houvener et al. |
| 6,047,282 | A  |   | 4/2000 | Wilson et al. |
| 6,119,096 | A  | * | 9/2000 | Mann et al. ..................... 705/5 |
| 6,167,517 | A  |   | 12/2000 | Gilchrist et al. |
| 6,320,974 | B1 | * | 11/2001 | Glaze et al. .................. 382/115 |
| 7,007,298 | B1 | * | 2/2006 | Shinzaki et al. ................. 726/3 |
| 7,020,308 | B1 | * | 3/2006 | Shinzaki et al. ............. 382/124 |

FOREIGN PATENT DOCUMENTS

| CA | 2285093 | 5/1999 |
| GB | 2278478 A | 11/1994 |
| JP | 10-269036 A1 | 10/1998 |
| JP | 11-134259 A1 | 5/1999 |
| JP | 2000-311138 A1 | 11/2000 |
| WO | WO99/23786 A1 | 5/1999 |
| WO | 01/06440 | 1/2001 |

\* cited by examiner

*Primary Examiner*—Thanhnga B. Truong
(74) *Attorney, Agent, or Firm*—Patzik, Frank & Samotny Ltd.

(57) ABSTRACT

The invention concerns a biometric identification or authentication system, comprising several matching units associated with biometric data storage units, data units for updating the biometric data of the data units and control means for processing matching requests and/or updating biometric data from at least one client unit, the control means comprising transaction management means designed on the basis of a transactional monitor to cause said units to communicate.

2 Claims, 2 Drawing Sheets

BIOMETRIC IDENTIFICATION OR AUTHENTICATION SYSTEM

BACKGROUND OF THE INVENTION

The present invention relates to biometric identification and/or authentication systems. These systems manipulate biometric data, consisting, for example of fingerprint coding data. Naturally, they may also represent other types of biometric measurements, for example on the eye, the hand, the face, the voice, etc.

More specifically the invention relates to relatively large-scale systems, in which many fingerprint records or other biometric data are stored in databases. These systems have to process matching requests accompanied by coded data representing a fingerprint, and determine, from among the numerous stored fingerprint records, the one or those that display the closest match.

The system must also be able to process update requests to insert or delete fingerprint records stored in the databases.

Distributed architectures are known to be adopted in these large systems, with a number of matching units among which the matching request processing load is distributed. Each matching unit operates with one part of the database. Several matching units form a string covering the whole of the database. Several strings of this type may be provided for processing several matching requests in parallel. For each part of the database, one data unit ensures the updating of the stored data according to the insertion and deletion requests submitted by the users.

Coordinating the processing of the different requests is a relatively delicate matter for ensuring the general consistency of the system. Many requests of various kinds succeed one another and the system must be capable of remaining stable and reliably answering each of these requests.

Achieving this objective normally requires considerable software development as part of a proprietary solution for the system.

One object of the present invention is to simplify this development in order to ensure good system performance and some flexibility in upgrading.

SUMMARY OF THE INVENTION

The invention thus provides a biometric identification or authentication system, comprising several matching units associated respectively with biometric data storage units, data units for updating the biometric data of the storage units and control means for processing matching requests and/or requests for updating stored biometric data originating from at least one client unit, the control means comprising transaction management means designed on the basis of a transactional monitor to cause said units to communicate.

The transactional monitor is a set of software modules created, in remote transaction commercial applications, to provide the properties of atomicity, consistency, isolation and durability ("ACID"). It has been found that these properties can be used to considerably simplify the coordination of exchanges in a distributed biometric identification system.

The property of atomicity ensures that all the operations belonging to a transaction form a work unit, which means that they must all be successfully performed or all rejected.

The property of consistency means that each transaction must pass through the database from one consistent state to another. If the transaction does not reach a stable final state, it brings the system back to the previous state.

The property of isolation means that the results of a transaction are only visible to other transactions once the transaction is validated. In other words, although they are executed simultaneously, the transactions appear to be executed sequentially.

The property of durability means that the modifications resulting from a validated transaction will never be lost.

DESCRIPTION OF PREFERRED EMBODIMENTS

Figure 1:
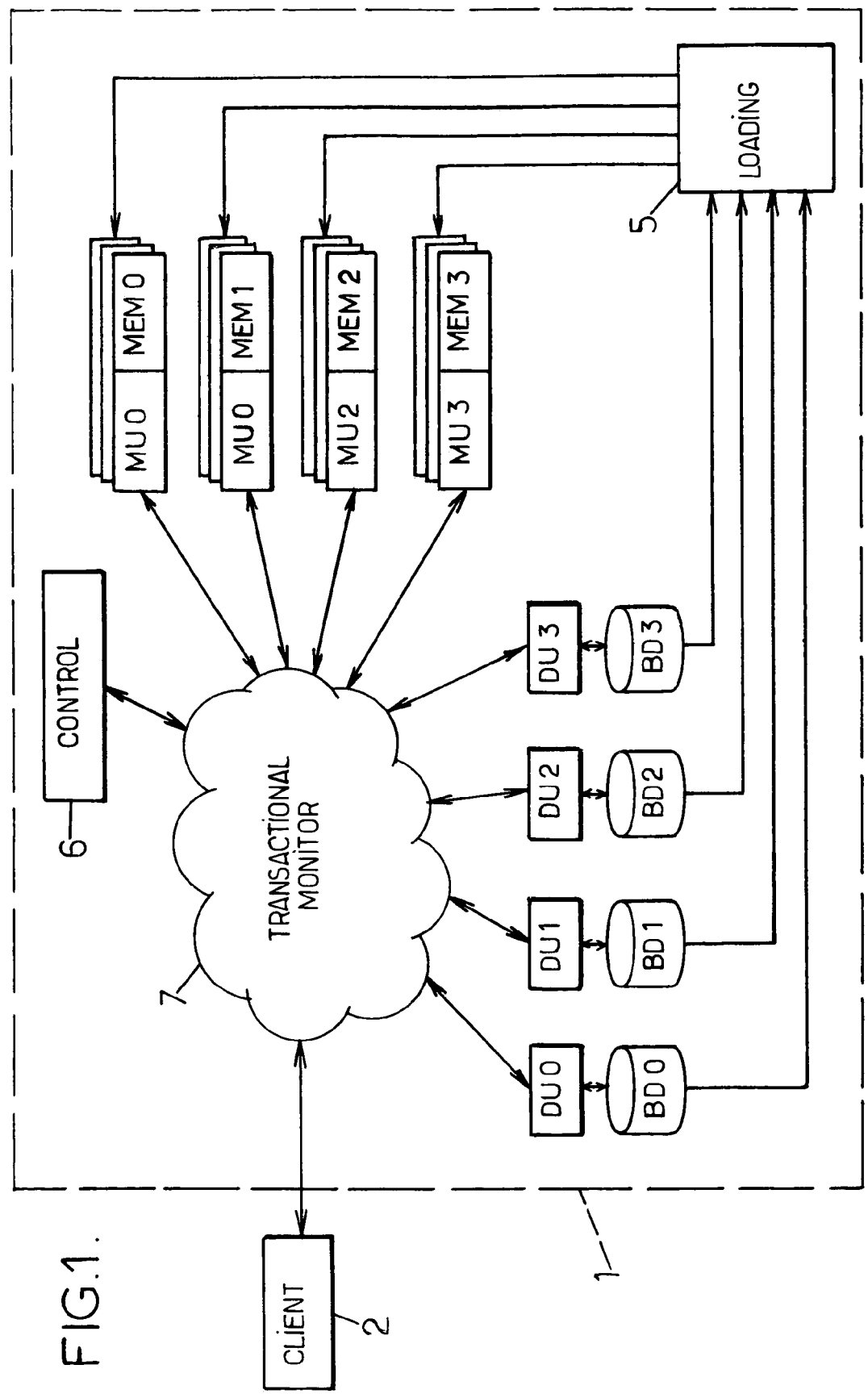
FIG. 1 is a diagram illustrating the architecture of a system according to the invention.
Figure 2:
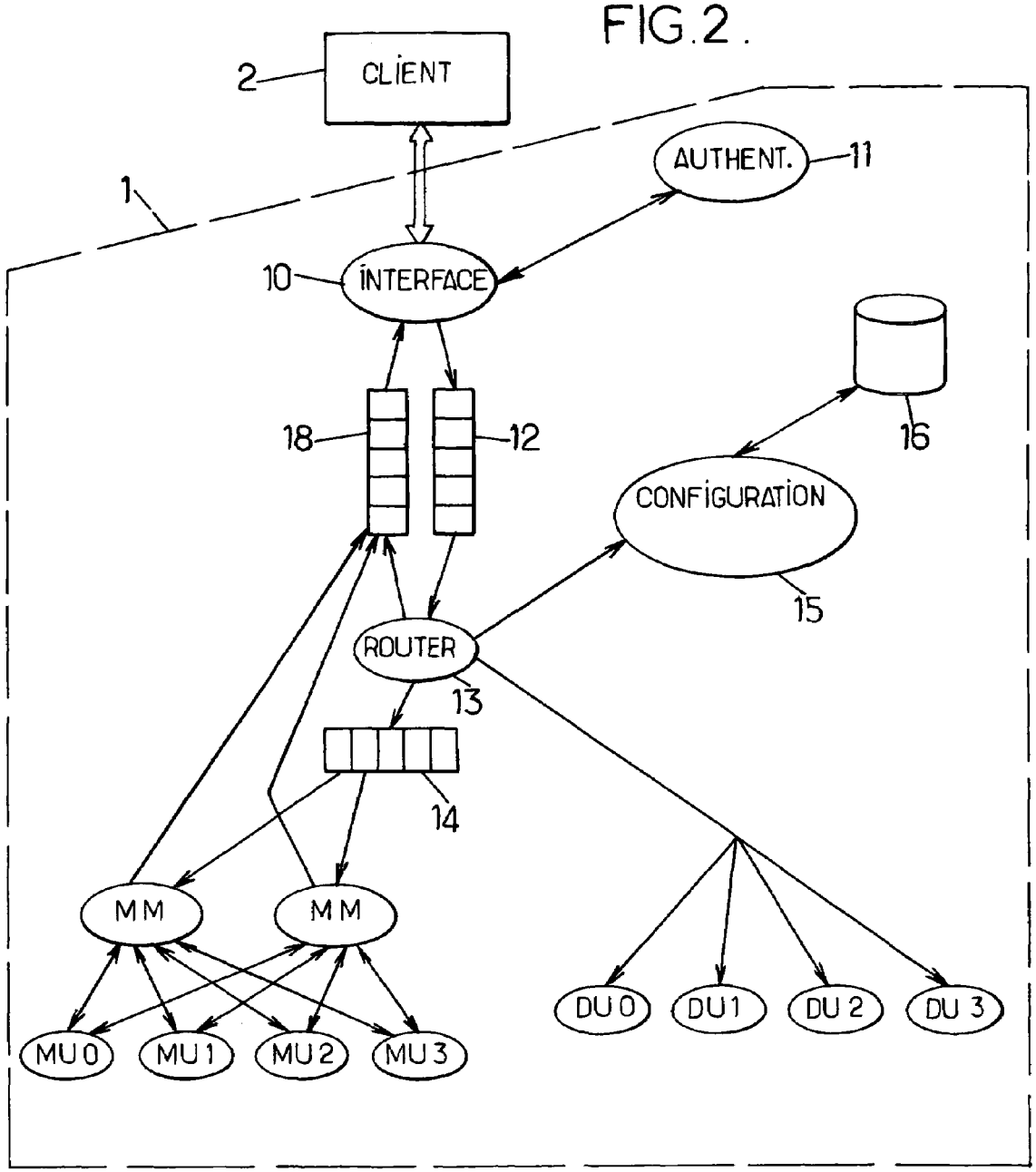
FIG. 2 is a diagram illustrating different processes used in the system.

The system 1 shown in FIGS. 1 and 2 is used in a fingerprint identification application. This is called a "matcher". It includes several intercommunicating servers. A "server" is understood here to be either a software process, or a programmed machine following such a process.

These servers include a number of matching units MU0-MU3 for processing matching requests originating from one or more client units 2. The set of fingerprint data is subdivided into n parts (n=4 in the example shown). Each of these parts is loaded into a memory MEMO-MEM3 of at least one of the matching units MU0-MU3. Each interrogated unit MU0-MU3 selects one or more entries from its part of the database by means of matching algorithms. These responses are then consolidated to present an overall response to the client 2.

As illustrated diagrammatically in FIG. 1, the matching units MU0-MU3 may each be present in a number of copies, each associated with the same part of the database. So the system comprises several strings of n=4 matching units MU0-MU3. One matching request is processed by one of these strings.

A loading server 5 ensures the presence of different parts of the fingerprint database in the memories of the matching units MU0-MU3. It obtains the data in question from n data units DU0-DU3, which process updating requests (insertion, deletion, etc.) originating from the client units 2. The data units DU0-DU3 also keep a copy of the database up to date in a long term storage memory, for example hard disk units BD0-BD3.

The system 1 further includes servers forming one or more control units 6 providing a number of monitoring functions: request management, administration, keeping request logs, access authorization, parameter setting and configuration, queue management, database initialization, indexing, file management, etc.

For organizing the exchanges between the various servers and the client or clients, the control units 6 cooperate with elements of a transactional monitor 7.

Transactional monitors are well-known means of transaction management in client-server architectures. Several types of transactional monitors have been standardized, especially by the International Standards Organization (OSI-CCR and OSI-TP) and by X/Open (DTP specification, Distributed Transaction Processing). Examples of commercial products usable as a transactional monitor 7 in the system 1 are "Encina" marketed by IBM and "Tuxedo" marketed by BEA Software.

With reference to FIG. 2, the system 1 includes an interface module 10 with the client units 2, which conventionally cooperates with an authentication server 11 validating client access to the system.

Requests emanating from the clients 2 are placed in an input queue 12 before being submitted to a routing server 13. The server 13 separates the matching requests routed to a second queue 14 and the update requests routed to the data units DU0-DU3. Other requests may be routed to a system configuration and parameter setting server 15. This server 15 cooperates with a memory unit 16 where the system configuration parameters are recorded.

Update requests are processed by the data units DU0-DU3, which record the modifications in the stored databases BD0-BD3, and which send the loading server 5 any data updating commands present in the memories MEMO-MEM3 associated with the matching units MU0-MU3.

The processing of matching requests coming out of the queue 14 is monitored by one or more management matching units MM (Management Matching). These present the requests to the matching units MU0-MU3, taking into account the partition of the fingerprint databases and the occupation of the various strings. The units MM collect the responses produced by the matching units MU0-MU3, consolidate the results returned by these units MU0-MU3, and send back the consolidated results to an output queue 18. The interface module 10 extracts these results from the queue 18 to present them to the client units concerned.

In the diagram in FIG. 2, the arrows shown inside the system 1 represent exchanges monitored by the transactional monitor 7, so as to ensure the aforementioned ACID properties. In addition, the transactional monitor 7 takes over the servers meeting the XA interface standard. File servers meeting this standard may be used for perpetuating biometric data and configuration data.

The invention claimed is:

1. A biometric identification or authentication system, comprising several matching units arranged for processing matching requests each relating to a single set of biometric data and associated respectively with biometric data storage units, data units for updating the biometric data of the storage units and control means for processing matching requests and/or requests for updating stored biometric data originating from a client unit, the control means comprising transaction management means for causing said units to communicate, wherein the transaction management means are designed as a transactional monitor providing the properties of atomicity, consistency, isolation and durability, and wherein at least a string of matching units cooperating with respective storage units each containing a part of the biometric data, each part being respectively associated with one of the data units, the control means comprising means of distribution of matching requests among the matching units of a string and means of consolidating responses returned by the matching units.

2. The system as claimed in claim 1, comprising several strings of matching units for processing several simultaneous matching requests in parallel, each part of the biometric data being stored redundantly, under the control of the associated data unit, in the corresponding storage units of the strings.

* * * * *